Nov. 18, 1969  G. V. GALLES  3,479,632
MOVABLE SUPPORT MEANS
Filed Jan. 11, 1968  2 Sheets-Sheet 1
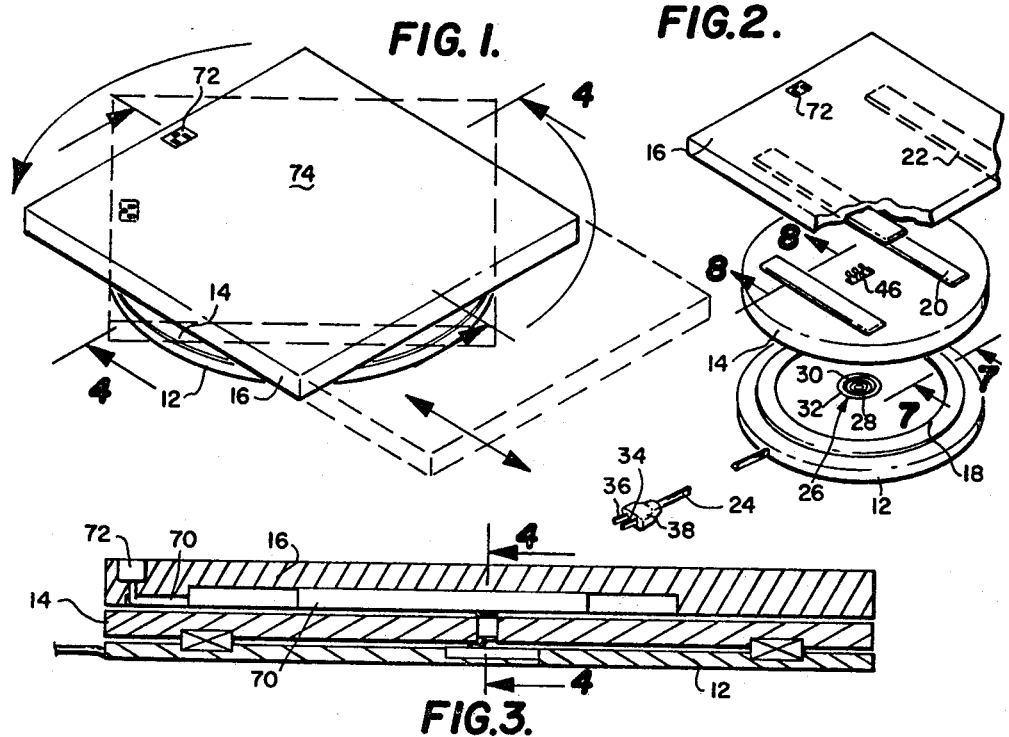
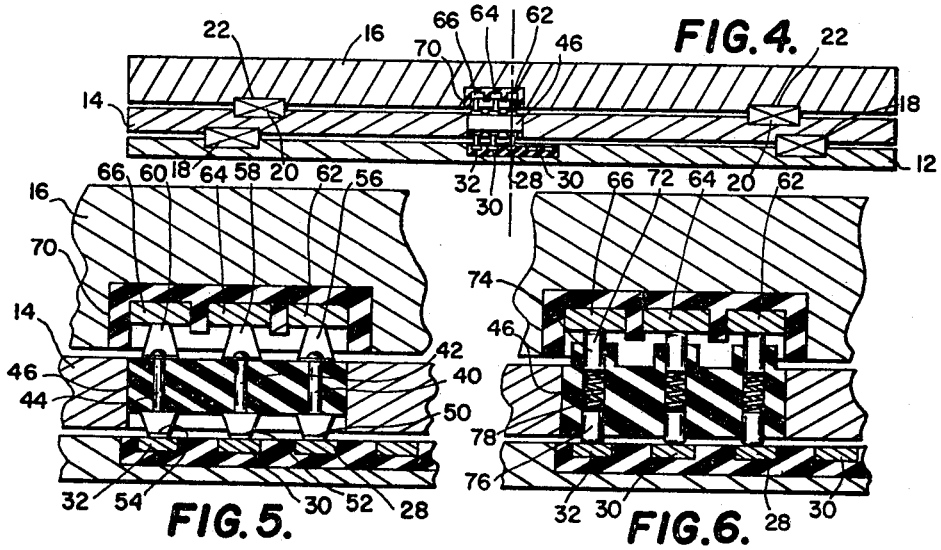
INVENTOR.
GILBERT V. GALLES
BY
Wm. H. Dean Nov. 18, 1969  G. V. GALLES  3,479,632
MOVABLE SUPPORT MEANS
Filed Jan. 11, 1968  2 Sheets-Sheet 2
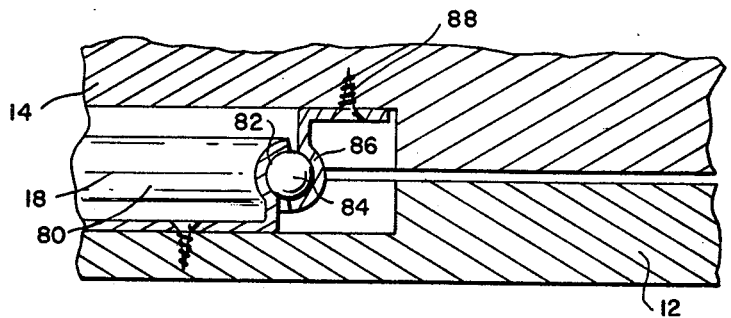
FIG. 7.
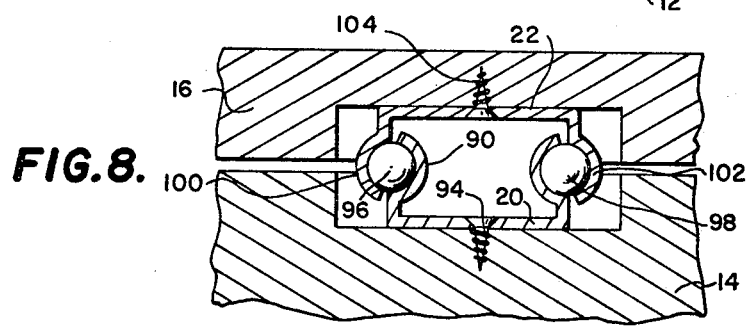
FIG. 8.
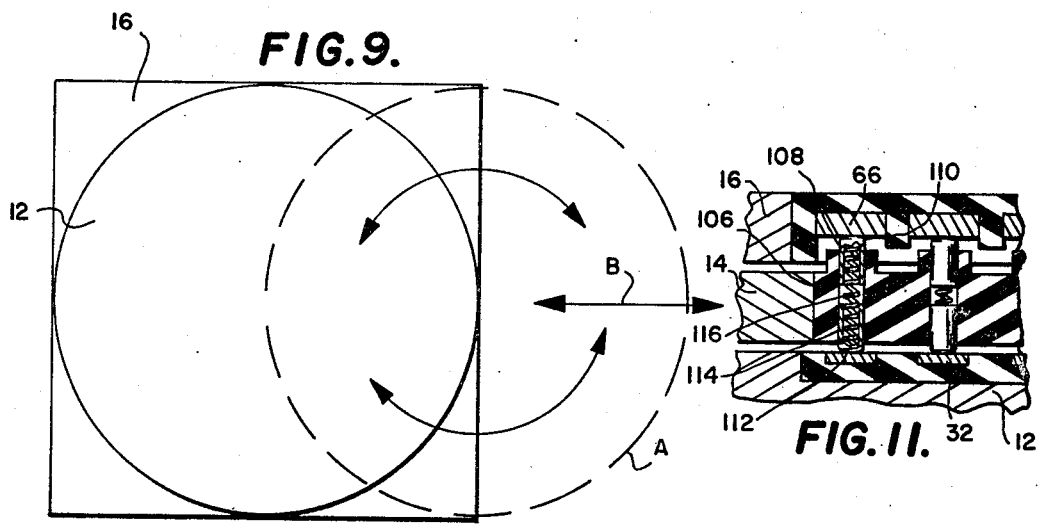
FIG. 9.
FIG. 11.
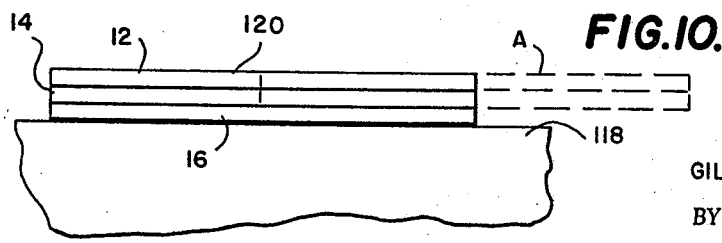
FIG. 10.
INVENTOR.
GILBERT V. GALLES
BY
Wm. H. Dean

United States Patent Office 3,479,632
Patented Nov. 18, 1969

3,479,632
MOVABLE SUPPORT MEANS
Gilbert V. Galles, 4522 N. 22nd St.,
Phoenix, Ariz. 85016
Filed Jan. 11, 1968, Ser. No. 697,139
Int. Cl. H01r 39/00; A47b 91/00
U.S. Cl. 339—5                                   4 Claims

ABSTRACT OF THE DISCLOSURE

A movable support table means comprising a stationary base member and first supporting table rotatably supported on a base member to rotate about a vertical axis; and a second supporting table supported to slide radially relative to said vertical axis, and wherein slip ring conductor means coupled to an electrical energy source are secured to the base and to the tables so that a business machine supported on a table may derive electrical energy while the tables are rotated about a vertical axis, and one of them is reciprocated horizontally relative to the base member and the other of said tables; said base and tables being invertible to provide a fixed rectilinear track and rotatable table means for production assembly work relative to articles of manufacture, such as electronic components or other devices.

---

This invention relates to a movable support means, and more particularly, to a movable support table means having mechanism for rotatably and reciprocally supporting articles, such as business machines or for use as a production facility in the assembly of articles of manufacture, such as electronic components, for example.

BACKGROUND OF THE INVENTION

Various business machines, such as adding machines, calculators and other similar machines may be used on various desks or tables in locations wherein the rotation or movement of such a machine may be desirable so that the machine may be used conveniently from different angular positions and at times, may alternately be shared by persons working at opposite sides of a desk, or the like. In many accounting offices and other similar business areas, calculators, for example, may be used by several persons. In some instances, it has been found desirable to provide for sharing of a calculator by two parties working at opposite sides of a desk, and in many instances, the width of the desk is such that the calculator may be rotated about a vertical axis, and also moved back and forth toward opposite edges of the desk. In addition to the foregoing requirements, the calculator or other business machine must be supplied with electrical energy without tangling the conventional cord-like conductors even though the machine may be constantly rotated throughout 360 degrees about a vertical axis and may be reciprocated back and forth toward opposite edges of the respective desk.

Additionally, a requirement has been recognized for assembly work relative to articles of manufacture, such as electronic components on circuit boards or the like, and for use in assembling many other articles of manufacture which includes the necessity of supporting components being assembled, such that the components may be rotated about 360 degrees around the vertical axis, and also may be reciprocated in a rectilinear direction horizontally with respect to the work area or bench upon which the assembly and production work is being carried on.

SUMMARY OF THE INVENTION

The movable support table means of the present invention employs a base member and first and second table members, said first table member being rotatably mounted on the base member to rotate throughout 360 degrees about a vertical axis with respect to the base member; said second table member being capable of movement in rectilinear relationship to the said first table member in a horizontal direction and at right angles to said vertical axis. An electrically conducting slip ring assembly interconnecting the base and the table member may constantly supply electrical energy to a business machine or other devices supported on the second table member, while the first table member is rotated about said vertical axis, and while said second table member is moved horizontally in a rectilinear manner with respect to the first table member. The invention comprises the foregoing base and first and second table members all in assembly, and which may be inverted, such that the aforementioned base is uppermost and forms a table which is rotatable about a vertical axis, and such that the aforementioned second table member may serve as a base. The invention may thus establish a fixed rectilinear path laterally with respect to a work bench, or the like, in such a manner that the work supported on the movable table means of the invention may be moved back and forth with relation to the edge of the work bench, and may be rotated about a vertical axis for a continuous assembly operation.

Accordingly, it is an object of the present invention to provide a business machine support which provides for convenience of operation of a single business machine, such as a calculator by two different persons alternately using the machine at opposite sides of a desk, or the like.

Another object of the present invention is to provide a very useful business machine support which allows complete vertical axis rotation of a business machine from one position to another, and further provides for rectilinear horizontal movement of the machine with respect to its vertical axis of rotation in order to provide directional convenience as well as lateral movable convenience, when a business machine is supported by the invention substantially in the middle of a wide desk or table at the opposite sides of which persons using the machine are working.

Another object of the invention is to provide a novel movable support table which may serve as a production facility for use in assembling equipment, such as electronic components, or the like, on circuit boards; the invention may thus be used for a great variety of production assembly work, due to the facility of moving a turntable back and forth in a fixed rectilinear path with respect to the edge of an assembly bench, and also due to a complete 360 degrees vertical axis rotation of the uppermost table member, such that the work being assembled may be viewed and approached from various angles.

Further objects and advantages of the invention may be apparent from the following specification, appended claims, and accompanying drawings:

BRIEF DESCRIPTION OF THE DRAWINGS

FIG. 1 is a perspective plan view of the movable support table means of the invention, showing by arrows, rotation of the table means about vertical axis and showing by broken lines, varying positions of the uppermost table member when moved about a vertical axis and also when reciprocated horizontally;

FIG. 2 is a vertically exploded view of the base rotatable tables and reciprocating track means of the invention, showing portions thereof broken away to amplify the illustration;

FIG. 3 is an enlarged sectional view taken from the line 3—3 of FIG. 1;

FIG. 4 is a sectional view taken from the line 4—4 of FIG. 3;

FIG. 5 is an enlarged fragmentary sectional view taken on substantially the same plane as FIG. 4, and showing details of the slip ring contact mechanism of the invention;

FIG. 6 is a view similar to FIG. 5, and showing a modification of the slip ring contact mechanism of the invention;

FIG. 7 is an enlarged fragmentary sectional view taken from the line 7—7 of FIG. 2;

FIG. 8 is an enlarged fragmentary sectional view taken from the line 8—8 of FIG 2;

FIG. 9 is a top or plan view of the mechanism shown in FIG. 1, but shown in an inverted position for use as a production assembly tool, and illustrating by broken lines a varying position of the table means rotatable about a vertical axis and movable in a horizontal or reciprocal direction;

FIG. 10 is a side elevational view of the structure shown in FIG. 9, and showing similar broken line positions; and FIG. 11 is a fragmentary sectional view similar to FIG. 5, and showing a further modification of the slip ring conductor contact mechanism of the invention.

DESCRIPTION OF THE PREFERRED EMBODIMENTS

As shown in FIG. 1 of the drawings, the invention comprises a base 12 having a first table 14 rotatably mounted on the base 12 about a vertical axis, as will be hereinafter described. A second table member 16 is reciprocally mounted on the first table member 14 in a horizontal rectilinear relation, as will be hereinafter described in detail, and as indicated by broken lines in FIG. 1 of the drawings.

The base 12, as shown in FIG. 2 of the drawings, is provided with a circular track means 18 supporting the first table member 14 to rotate about a vertical axis. The upper portion of the first table member 14 carries reciprocal track means 20 which cooperates with complemental track means 22 on the second table member 16.

Connected to the base member 12 is an electrical cord 24 having three conductors, one of which is a ground conductor. These conductors are coupled to slip ring conductor means 26 on the upper side of the base 12. The slip ring conductor means 26 comprises a central contact 28, a first annular contact 30 which immediately surrounds the central contact 28, and second annular contact 32 which surrounds the contact 30. These contacts 30 and 32 are radially spaced from each other and radially spaced from the central contact 28, and are adapted to be engaged by brushes. These contacts 28, 30 and 32 are connected to the three conductors of the flexible cord 24, the conductors being designated 34, 36 and 38. As shown in FIGS. 4, 5 and 6 of the drawings, the contacts 28, 30 and 32 are engaged by an assembly of intermediate and respective brush contacts 40, 42 and 44 which are carried in an insulated block 46 mounted in the first table member 14. The contacts 40, 42 and 44 are provided with respective electrical brush wiper elements 50, 52 and 54 which electrically and movably contact the contacts 28, 30 and 32.

Upper ends 56, 58 and 60 of the contacts 40, 42 and 44 engage elongated rectilinear contacts 62, 64 and 66, respectively, carried in a lower portion of the second or uppermost table 16, all as shown best in FIGS. 4 and 5 of the drawings.

The rectilinear contacts 62, 64 and 66 are carried in an insulated assembly block 70 which is recessed in a lower portion of the table member 16. Connected to the rectilinear contacts 62, 64 and 66, is an electrical conductor cord 70 having three conductors terminating in a receptacle plug 72 adapted to receive prongs of a conventional three-prong plug which may be electrically connected to a business machine, or the like, supportable on the upper surface 74 of the second or upper table member 16.

In the modification, as shown in FIG. 6 of the drawings, the intermediate contacts 40, 42 and 44 comprise carbon brushes and springs, the springs tending to force two carbon brushes apart to attain efficient contact with the respective circular and reciprocal conductors in a similar manner, as shown in FIG. 5.

Accordingly, only one of the carbon brush conductors will be described, and this one makes connection between the circular conductor 32 and the rectilinear contact 66. This carbon brush contact is designated 72 in FIG. 6 of the drawings, and comprises a carbon member 74 and engaging the rectilinear contact 66 and a carbon member 76 engaging the circular contact 32. A spring 78 compressively forces the carbon members 72 and 76 apart into proper intimate electrical engagement with the respective conductors 66 and 32. All of the contacts similar to the contact 72 are supported in the support block 46 in a similar manner, as shown in FIG. 5 of the drawings.

As shown in FIG. 7 of the drawings, the first table member 14 is supported on the base 12 by means of the circular bearing track mechanism 18. This mechanism includes an inner annular track 80 having an arcuate race 82 in the periphery thereof which engages a row of ball bearings 84. This track 80 is fixed to the base 12 by screws or any other means, as desired. A second circular track 86 surrounds the row of ball bearings 84 and holds them captive with relation to the arcuate track 82. This annular track 86 is secured to the first table member 14 by means of screws 88. Thus, the first table member 14 is rotatably mounted on the base 12 on a vertical axis which passes through the central contact 28 and allows complete 360 degrees rotational movement of the table 14 relative to the base 12, so that the electrical contacts 40, 42 and 44, hereinbefore described, may continually engage the respective contacts 28, 30 and 32 to conduct to the rectilinear contacts 60, 64 and 66, as will be hereinafter described.

The second table member 16 is reciprocally mounted on the first table member 14 by bearing tracks 20 and 22, as shown in FIG. 8 of the drawings. The track 20 is provided with opposed arcuate sections 90 and 92, and is secured to the second table member 14 by means of screws 94. Ball bearings 96 and 98 engage the respective track portions 90 and 92, and these ball bearings 96 and 98 are engaged in opposed relation to the tracks 90 and 92 by respective tracks 100 and 102 of the track member 22 which is secured to the second table member 16 by means of screws 104.

It will be seen from FIG. 2 of the drawings, that there are a pair of spaced parallel track members 22 and 24 which straddle the conductor support block 46 and provide for stabilized rectilinear movement of the second table member 16 relative to the first table member 14. Thus, the contacts 40, 42 and 44, at their upper contact ends 56, 58 and 60, constantly engage the rectilinear conductors 62, 64 and 66, as the second table member 16 is reciprocated horizontally with respect to the first table member 14. Accordingly, it will be appreciated by those skilled in the art that a business machine, or the like, may be moved horizontally relative to the vertical axis of the bearing track 18, and that a business machine may be rotated about a vertical axis of the bearing track 18 concurrently all the while attaining or maintaining electrical contact with the power source in connection with the cord 24, as hereinbefore described.

A further modification of the contacts 40, 42 and 44 is shown in FIG. 11, wherein such contacts in a modified form are designated 106. Each contact 106 is provided with a cylindrically shaped cup 108 having a spherical end 110 adapted to engage the rectilinear contact 66, hereinbefore described, or any of the other respective contacts 62 or 64. The opposite end of the contact 106 is formed by a spherical end 112 of the telescopically mounted, hollow, cylindrical cup structure 114 which is reciprocally mounted internally of the cup 108, hereinbefore described. A spring 116 is contained internally of the hollow, cylindrical cup-shaped contacts 108 and 112, and tends to force them apart into firm electrical engagement with the conductors 32 and 66 or other respective conductors, as have been hereinbefore described.

As shown in FIGS. 9 and 10 of the drawings, the movable support table means of the invention may be inverted, such that the table member 16 forms the base, whereby the base 12 forms an upper table member. In this instance, the member 16 is fixed to an upper surface 118 of a conventional factory work bench, or the like, so that the track means 20 and 22 will provide a fixed rectilinear path for the movements of the table members 12 and 14 to carry them into broken line position, as shown in FIGS. 9 and 10 of the drawings, and to thereby allow the vertical axis of rotation to be moved in a horizontal direction, as indicated by an arrow B in FIG. 9 of the drawings. The invention, when used in this manner, may provide a surface 120 of the member 12 as a support for electrical components, or electronic components, including circuit boards on which transistors, diodes and other electronic components may be assembled. The table 12 may then rotate 360 degrees or less about the vertical axis of the bearing tracks 18 so that the components may be viewed from various angles while being assembled with relation to a circuit board. This arrangement provides for the use of such an assembly facility close to the edge of a shop bench 118 and permits the member 12, carrying the parts being assembled, to be forced back away from the edge of the bench or other areas into a position, as shown by solid lines in FIGS. 9 and 10 of the drawings.

I claim:

1. In a movable support table means, the combination of: three substantially horizontal support members, a pair of said support members movably mounted on a third one of said members; turntable bearing means having a substantially vertical axis of rotation; a rectilinear horizontally movable bearing means coupled between two of said members; said turntable bearing means coupled between one of said two members, and the remaining one of said three members; a rotary slip ring conductor assembly having a plurality of annular conductors; a horizontally movable rectilinear conductor assembly having a corresponding plurality of elongated conductors; and intermediate contacts movably interengaging said respective annular and rectilinear contacts in rotary and rectilinearly slidable relation, said slip ring conductor assembly carried by one of said support members, said rectilinear conductor assembly carried by another of said support members; said contacts carried by an intermediate one of said support members; and electrical power input conductor means secured to a lowermost one of said respective members and electrically coupled to one of said conductor assemblies; and an electrical power outlet conductor means secured to an uppermost one of said support members and electrically coupled to one of said conductor assemblies carried by said uppermost member, whereby an electrically operable business machine, or the like, may be supported on said uppermost support member and may derive electrical energy from said input conductor means, while said table members rotate about a vertical axis and move horizontally relative to said base member.

2. The invention, as defined in claim 1, wherein: said annular conductors are disposed in concentric spaced relation to each other.

3. The invention, as defined in claim 2, wherein: said elongated conductors engage respectives ones of said intermediate contacts and said intermediate contacts engage respective annular contacts.

4. The invention, as defined in claim 1, wherein: said slip ring conductor assembly comprises spring loaded intermediate contacts having pairs of contact elements forced in opposite directions into intimate engagement with said rectilinear conductors and said annular conductors.

References Cited

UNITED STATES PATENTS

| 1,322,886 | 11/1919 | Edman | 339—6 X |
| 2,290,464 | 7/1942 | Buchheit | 248—425 X |
| 2,681,690 | 6/1954 | Johnson et al. | 248—425 X |
| 2,887,910 | 5/1959 | Williamson | 339—5 X |

RICHARD E. MOORE, Primary Examiner

U.S. Cl. X.R.

248—349